(12) United States Patent
Young et al.

(10) Patent No.: US 9,821,902 B2
(45) Date of Patent: Nov. 21, 2017

(54) HIGH LIFT CONTROL METHOD AND SYSTEM FOR AIRCRAFT

(71) Applicant: Bombardier Inc., Dorval (CA)

(72) Inventors: Robert Young, Montreal (CA); Yves Grenier, Lachine (CA); Hany Sadek, Pierrefonds (CA)

(73) Assignee: BOMBARDIER INC., Dorval (CA)

( * ) Notice: Subject to any disclaimer, the term of this patent is extended or adjusted under 35 U.S.C. 154(b) by 9 days.

(21) Appl. No.: 14/771,974

(22) PCT Filed: Feb. 26, 2014

(86) PCT No.: PCT/IB2014/000213
§ 371 (c)(1),
(2) Date: Sep. 1, 2015

(87) PCT Pub. No.: WO2014/135945
PCT Pub. Date: Sep. 12, 2014

(65) Prior Publication Data
US 2016/0009375 A1     Jan. 14, 2016

Related U.S. Application Data

(60) Provisional application No. 61/773,564, filed on Mar. 6, 2013.

(51) Int. Cl.
*B64C 13/04* (2006.01)
*B64C 13/16* (2006.01)
*B64C 9/28* (2006.01)
*B64D 45/00* (2006.01)

(52) U.S. Cl.
CPC ............... *B64C 13/04* (2013.01); *B64C 9/28* (2013.01); *B64C 13/16* (2013.01); *B64D 2045/001* (2013.01)

(58) Field of Classification Search
CPC ............................... B64C 13/04; B64C 13/16
See application file for complete search history.

(56) References Cited

U.S. PATENT DOCUMENTS

| 8,356,776 B2 | 1/2013 | Berens et al. |
| 9,327,824 B2 * | 5/2016 | Good ........................ B64C 9/20 |
| 2009/0152403 A1 | 6/2009 | Delaplace |

(Continued)

FOREIGN PATENT DOCUMENTS

| CN | 101467114 | 6/2009 |
| CN | 101674980 | 3/2010 |

(Continued)

OTHER PUBLICATIONS

PCT International Search Report and Written Opinion dated Aug. 6, 2014 re: International Patent Application No. PCT/IB2014/000213.

(Continued)

*Primary Examiner* — Joseph W Sanderson
(74) *Attorney, Agent, or Firm* — Norton Rose Fulbright Canada LLP

(57) ABSTRACT

A high lift control system for an aircraft having at least one high lift surface includes a selector having a predetermined number of discrete positions, at least one of the predetermined positions corresponding to different positions of the at least one high lift surface.

22 Claims, 3 Drawing Sheets

| LEVER | FLIGHT PHASE | EICAS | SLAT | FLAP |
|---|---|---|---|---|
| 0 | CRUISE | 0 | A | A |
| 1 | SLAT OUT | 1 | B | A |
| 2 | TO/ALT APP | 2 | B | C |
| 3 | NORMAL TO | 3 | B | D |
| 4 | SHORT TO | 4 TO | B | B |
| 4 | APP / ALT LDG | 4 LD | E | B |
| 5 | NORMAL LDG | 5 | E | F |

(56) References Cited

U.S. PATENT DOCUMENTS

| | | | |
|---|---|---|---|
| 2009/0302174 | A1 | 12/2009 | Ausman et al. |
| 2010/0155542 | A1 | 6/2010 | Heller |
| 2010/0200704 | A1 | 8/2010 | Berens et al. |
| 2012/0153085 | A1 | 6/2012 | Good et al. |
| 2015/0083850 | A1* | 3/2015 | Moser ................. B64C 9/16 244/99.2 |
| 2015/0105945 | A1* | 4/2015 | Moser ................. B64C 13/04 701/3 |

FOREIGN PATENT DOCUMENTS

| | | |
|---|---|---|
| CN | 101808896 | 8/2010 |
| CN | 102530241 | 7/2012 |
| EP | 1619119 A2 | 1/2006 |
| WO | 2009040102 A1 | 4/2009 |

OTHER PUBLICATIONS

English abstract of Chinese Patent Application No. 101467114(A) from http://wordwide.espacenet.com.
English abstract of Chinese Patent Application No. 101808896(A) from http://wordwide.espacenet.com.
English abstract of Chinese Patent Application No. 102530241(A) from http://wordwide.espacenet.com.
English abstract of Chinese Patent Application No. 101674980(A) from http://wordwide.espacenet.com.
Chinese Patent Office; Office Action dated Mar. 24, 2016 re: Chinese Patent Application No. 201480012334.9.
Chinese Patent Office; Office Action dated Nov. 14, 2016 re: Chinese Patent Application No. 201480012334.9.

* cited by examiner

| LEVER | FLIGHT PHASE | EICAS | SLAT | FLAP |
|---|---|---|---|---|
| 0 | CRUISE | 0 | A | A |
| 1 | SLAT OUT | 1 | B | A |
| 2 | TO/ALT APP | 2 | B | C |
| 3 | NORMAL TO | 3 | B | D |
| 4 | SHORT TO | 4 TO | B | B |
| 4 | APP / ALT LDG | 4 LD | E | B |
| 5 | NORMAL LDG | 5 | E | F |

FIG. 2

HIGH LIFT CONTROL METHOD AND SYSTEM FOR AIRCRAFT

CROSS REFERENCE TO RELATED APPLICATION AND CLAIM OF PRIORITY

This application is a national phase application under 35 U.S.C. 371 of International Patent Application No. PCT/IB2014/000213 filed on Feb. 26, 2014, which claims priority from U.S. provisional patent application no. 61/773,564 filed on Mar. 6, 2013, the entire contents of which are hereby incorporated by reference.

FIELD OF THE INVENTION

The present invention relates in general to aircraft, and in particular, to a high lift control method and system for aircraft.

BACKGROUND OF THE INVENTION

High lift control systems for modern aircraft typically comprise one or more moveable leading edge slats and/or one or more moveable trailing edge flaps located on each wing of the aircraft. The slats and flaps are aerodynamic surfaces that, when deployed or extended out from the respective edge of the wing, produce a relatively higher coefficient of lift for the aircraft. Some aircraft have both slats and flaps while other aircraft have only flaps. This increased lift allows the aircraft to be flown at slower speeds, thereby allowing the aircraft to take-off and land in shorter distances (i.e., on shorter runways). On the other hand, at aircraft cruise altitudes the slats and flaps are typically not deployed and are, thus, held in their retracted or stowed positions.

The high lift surfaces (e.g., slats and flaps) are typically held in their retracted positions and in various deployed positions by mechanical actuators, which are each driven by a central power drive unit via a mechanical driveline. A moveable high lift selector lever in the cockpit (e.g., in the center pedestal) allows the pilot or co-pilot to select a desired high lift configuration (i.e., a particular angular position of the slats and flaps). The lever typically has a number of discrete detent positions, as the lever is moved or extended aft or rearward when it is desired to land the aircraft from a cruising in-flight phase. The discrete detent positions of the lever are sensed by one or more sensors, which convert the lever positions to variable electrical signals. These signals are read by one or more control computers. In reponse to changes in the lever position, the control computer commands the power drive units to drive the actuators and hence the slats and/or flaps to new positions with respect to the wings. For each discrete detent position of the lever, there typically is a unique angular position of the slats and/or flaps with respect to the corresponding wing.

Also, when moving the high lift selector lever in the opposite, retract or fore direction when it is desired to effect a take-off of the aircraft to ultimately achieve a cruise condition of the aircraft, the lever is again typically moved into some or all of the discrete detent positions. There may not be as many such discrete detent positions of the lever needed in this retract direction in order to have the aircraft go from take-off to cruise. Nevertheless, for each discrete detent position of the lever in this take-off direction, typically in the prior art the slats and/or flaps are in the same angular position as they are in the opposite extending aft direction of the lever. This is so for certain exemplary embodiments of a high lift selector lever that moves in two different opposite directions. Other types of high lift selector levers may be utilized that operate in a manner different from simply two opposite directions.

Problems with this type of known, conventional high lift control system for aircraft include the fact that there typically exist a limited number of unique positions of the slats and/or flaps due to the limited number of different discrete mechanical positions of the high lift selector lever. Modern aircraft typically have a high lift selector lever that has anywhere from four to nine discrete mechanical positions. Oftentimes the number of lever positions depends on the physical space available in the center pedestal of the cockpit to accommodate a desired physical size for the high lift selector lever.

When it is desired to increase the take-off and landing performance of the aircraft by increasing the number of high lift positions of the slats and/or flaps, one possible solution is to increase the number of discrete, physical mechanical positions of the high lift selector lever. However, problems with this approach include the fact that such a lever having more discrete positions results in a larger flap lever assembly to maintain a suitable separation between each discrete lever position. Also, there exists a human performance factor impact in the form of geometric and ergonomic factors (e.g., reduced proprioceptive cues) along with various cognitive factors (e.g., increased attention, increased memory load, time and opportunity for error, and increased cognitive and visual complexity). Thus, increasing the number of discrete, physical mechanical positions of the high lift selector lever is not a desirable solution to increasing the take-off and landing performance of the aircraft.

What is needed is an improved high lift control system for aircraft which limits the number of discrete physical mechanical positions of the high lift selector lever, while at the same time increasing the number of high lift positions of the slats and/or flaps.

SUMMARY OF THE INVENTION

According to an embodiment of the present invention, a high lift control system for an aircraft having at least one high lift surface includes a selector having a predetermined number of discrete positions, at least one of the predetermined discrete positions corresponding to different positions of the at least one high lift surface.

Embodiments of the present invention provide for relatively greater flexibility of multiple high lift configurations, thereby enhancing aircraft take-off and approach/landing performance within the constraints of a fixed number of positions on the selector such as, for example, a high lift selector lever in the cockpit of the aircraft.

Advantages of embodiments of the present invention include a reduction in the number of lever positions to simplify pilot workload and a reduction in the possibility of incorrect selection by the pilot. Embodiments of the present invention also allow for a more compact high lift selector lever which can be an important factor in the ergonomic design of the aircraft cockpit. Further, embodiments of the present invention are considered to be simpler implementations over other methods of achieving different aircraft high lift surface positions for a given high lift selector lever position.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

FIG. 2 is a chart illustrating various discrete positions of the high lift selector lever together with various phases of aircraft flight and the corresponding positions of the slats and flaps in accordance with an embodiment of the present invention.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In embodiments of the present invention, a high lift control system for an aircraft having at least one high lift surface includes a selector having a predetermined number of discrete positions, at least one of the predetermined discrete positions corresponding to different positions of the at least one high lift surface.

The foregoing and other features of various disclosed embodiments of the invention will be more readily apparent from the following detailed description and drawings of the illustrative embodiments of the invention wherein like reference numbers refer to similar elements.

Figure 1:
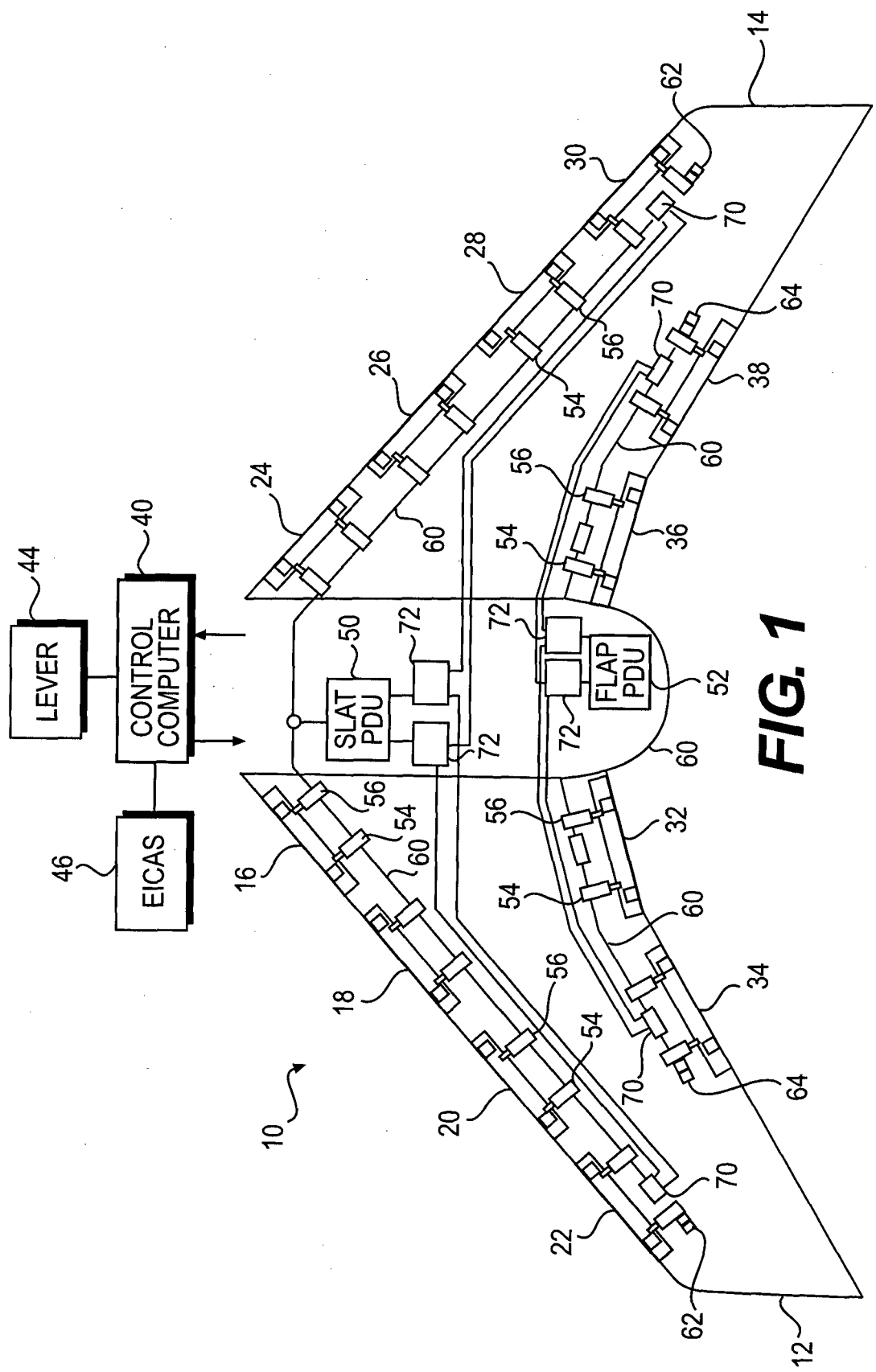
FIG. 1 is a schematic diagram of the wings portion of an aircraft having a number of high lift slats and flaps and related components located thereon together with a high lift control system that operates in accordance with embodiments of the present invention.

Referring to FIG. 1, there illustrated is a schematic diagram of a portion of a typical aircraft 10 having two wings 12, 14. The wings 12, 14 each have a number high lift components in the nature of slats 16-30 and flaps 32-38 and related components together with a high lift control system 40 that operates in accordance with embodiments of the present invention. Other types of aircraft may only have the flaps 32-38 and not both slats and flaps. Embodiments of the present invention are equally applicable to these various slat and/or flap configurations. It should be understood that the high lift control system may comprise one or more control computers, processors, logic circuits, or other types of logic or processing circuits in which software embodying the logic in a method for controlling the high lift surfaces (e.g., the slats 16-30 and/or the flaps 32-38) may be executed. In this exemplary embodiment, each wing 12, 14 has four slats 16-22 and 24-30, respectively, disposed on the leading edge of each wing 12, 14, along with two flaps 32-34 and 36-38, respectively, disposed on the trailing edge of each wing 12, 14. The slats 16, 24 closest to the aircraft fuselage are designated as the inboard slats. The remaining three slats 18-22 and 26-30 on each wing 12, 14, respectively, are designated the outboard slats.

Also shown in FIG. 1 is a mechanical lever 44 typically located in the center pedestal of the cockpit of the aircraft. In an embodiment, the high lift selector lever 44 (a.k.a., the "selector") is manually movable by either pilot in one of two opposite directions (e.g., an aft or extend direction when landing the aircraft, and a fore or retract direction when taking off from a runway) when it is desired to control the position of the slats 16-30 and flaps 32-38 during various phases of flight of the aircraft 10. Other directions of movement of travel of the lever 44 other than in two opposite directions may be possible. Various parameters of the lever 44 and of the slats 16-30 and the flaps 32-38 (e.g., position) may be displayed to the pilots in the cockpit on a typical engine-indicating and crew alerting system (EICAS) 46, which is basically a visual display screen in the cockpit that displays all types of aircraft data in various formats to the pilots to enable them to better control the aircraft. It is understood that, although a selector lever 44 is depicted, it should not be construed as being limitative. Any selector allowing a pilot to input control commands to the control computer 40 is contemplated as falling with the scope of the present invention. Such selector could be implemented via hardware (e.g., a pivoting knob having a plurality of discrete positions) and/or implemented via software (e.g., a graphical representation of a lever or a knob on a touchscreen).

All eight of the slats 16-30 in an embodiment of the present invention may be driven by a single slat power drive unit (PDU). Similarly, all four of the flaps 32-38 may be driven by a single flap PDU 52. Each PDU 50, 52, may comprise, for example, two redundant speed summed hydraulic motors. Each slat 16-30 and flap 32-38 may have two actuators 54, 56 for driving the associated slat 16-30 or flap 32-38 into a desired position (e.g., retracted or extended to a degree). Power is transmitted from each PDU 50, 52 to the actuators 54, 56 for each slat 16-30 or flap 32-38 using, e.g., a solid transmission shafting or driveline 60. Each PDU 50, 52 includes a sensor for sensing the position of the slats 16-30 or flaps 32-38. Also, a sensor 62 located at each wingtip end of the slats 16-30 is also used to sense the position of the slats 16-30. Similarly, a sensor 64 located at the each wingtip end of the flaps 32-38 is used to sense the position of the flaps 32-38. Also, each set of slats 16-30 and flaps 32-38 on each wing 12, 14 has a hydraulic brake 70. Various hydraulic systems 72 are provided to supply hydraulic fluid and thus power to various hydraulic components associated with the slats 16-30 and flaps 32-38. Electrical battery power (not shown) is also provided to the various components as needed, and in typical fashion.

As mentioned hereinabove, the high lift selector lever 44 is used by the pilots to control the position of the slats 16-30 and flaps 32-38 during various phases of flight of the aircraft 10. Thus, the high lift selector lever 44 is the primary control input for controlling the position of the slats 16-30 and flaps 32-38. Although not shown, an alternate control switch may be included that provides reversionary control in the event of a jammed lever 44.

The high lift control system computer 40 may be partitioned into a dual active architecture: one portion containing two slat channels and a second portion containing two flap channels. This is done for redundancy purposes. That is, if one slat or flap channel fails, the other operable slat or flap channel can operate the entire respective slat or flap system. The control computer 40 connects with the PDUs 50, 52, with the various sensors 62, 64 described hereinabove, and with other components in FIG. 1.

For example, and without being limitative, there can be two high lift slat/flap configurations for each discrete detent position of the high lift selector lever 44: one configuration for take-off, and another for approach/landing. The take-off slat/flap configuration is selected when the aircraft is "ON GROUND" and when it is established that the aircraft is set for take-off. The approach/landing slat/flap configuration is selected when the aircraft is "IN FLIGHT" and it is desired to land the aircraft. Signals from various typical aircraft systems are used to determine the "ON GROUND" and "IN FLIGHT" conditions: for example: "weight on wheels," "wheel speed," and "air speed." With these signals, software within the control computer 40 automatically determines whether the aircraft is "ON GROUND" or "IN FLIGHT" and will command the slats 16-30 and flaps 32-38 to the corresponding "take-off" or "approach/landing" slat and flap angular positions. For pilot awareness, the control computer 40 also provides a signal to the EICAS 46 which displays the selected position ('TO" for take-off, and "LD" for approach/landing).

In alternative embodiments, different configurations of the high lift surfaces (slats 16-30 and/or flaps 32-38) may be based on other aircraft operating conditions besides the aircraft being on the ground or in-flight. For example, the different speeds of the aircraft during the entire flight envelope may be utilized to determine the differing positions of the high lift surfaces.

Referring also to FIG. 2, there illustrated is a chart 100 showing various discrete positions of the high lift selector lever 44 together with various phases of aircraft flight and the corresponding exemplary positions of the slats and flaps in accordance with an embodiment of the present invention. These positions of the slats 16-30 and the flaps 32-38 for the various flight phases are typically programmed into software within the high lift control system computer 40.

More specifically, the chart 100 of FIG. 2 includes a column 104 that shows the six different discrete physical detent positions (i.e., 0-6) of the high lift selector lever 44. It is to be understood that six different positions for the lever 44 is purely exemplary. Other numbers of positions of the lever 44 may be utilized within the broadest scope of the present invention.

In a column 108 next to the lever column 104, there indicated is the corresponding exemplary flight phase of the aircraft 10 when the lever is in the corresponding position of column 104. Note that for each of lever positions 0-3 and 5, there is only one flight phase set forth (e.g., the cruise flight phase for lever position 0). However, for lever position 4, there are two different flight phases set forth: one for "short TO" (i.e., short take-off) and another for "APP/Alt LDG" (i.e., approach/alternate landing). The significance of having two different flight phases for a single position of the high lift selector lever 44 will become apparent in light of the discussion hereinafter. Next, in a column 112 there is the corresponding display on the EICAS 46 for each lever position and corresponding flight phase.

This is followed by a column 116 that lists the amount of extension or deployment of the slats 16-30 using generic variables (e.g., A, B, C, etc.), where it should be understood that those variables generically indicate the amount of extension of the slats 16-30 in degrees for each lever position and flight phase. That is, instead of listing the slat and flap positions in specific amounts of degrees, for simplicity, variables were utilized instead. Similarly, column 118 lists the amount of extension or deployment of the flaps 32-38 again using generic variables instead of actual degrees.

Thus, in operation of the aircraft 10 in accordance with the embodiment of the present invention set forth in the chart 100 of FIG. 2, when the aircraft is in the "cruise" flight phase, the lever 44 is in position 0, which is the farthest fore or retracted position, and both the slats 16-30 and the flaps 32-38 are fully stowed or retracted, which is indicated in the chart 100 as position "A." Position "A" would typically correspond to a certain angular position of the slats and flaps. This is also the case for the other variable-indicating positions (e.g., "B" through "F") discussed hereinafter. Then, when the pilot desires to land the aircraft, the pilot manually moves the lever 44 in the aft or extended direction into position 1 (i.e., the "slat out" position). In this position according to the chart 100 of FIG. 2, the slats 16-30 each assume an angular position of variable "B" while the flaps 32-38 remain at position "A" in their stowed position.

Next the pilot moves the lever 44 into position 2, which is the "alternate approach" flight phase of the aircraft 10. Here, the slats 16-30 remain in position "B" as in lever position 1, while the flaps 32-38 are moved to angular position "C." The pilot then moves the lever 44 into position 3, in which the slats 16-30 stay in the same angular position "B" as in lever position 2, while the flaps 32-38 move to angular position "D."

Next, the pilot moves the lever 44 into position 4, which has two different angular positions of the slats 16-30, as seen in the chart 100 of FIG. 2 and in accordance with an embodiment of the present invention. Since the lever 44 is being moved in the aft or extended direction, the pilot is attempting to land the aircraft 10. Thus, of the two choices for the flight phase 108 in FIG. 2, the slats 16-30 are moved to angular position "E," which is the "approach/alternate landing" flight phase of the aircraft 10. Also, the flaps 32-38 are moved into angular position "B."

Finally, the pilot moves the high lift selector lever 44 into position 5, which represents the "landing" flight phase of the aircraft 10. In this embodiment, the slat angles remain in position "E," and the flaps 32-38 are moved into angular position "F."

Now, interpreting the chart 100 of FIG. 2 in the reverse direction shows that the aircraft 10 is on the ground and ready for take-off. The pilot has several options for take-off in the chart 100 of FIG. 2. The pilot can choose between a "hot-and-high" take-off, a "normal" take-off, or a "short field" takeoff.

If the pilot chooses a "hot-and-high" takeoff, the slats 16-30 and the flaps 32-38 are set to the respective positions that correspond to lever position 2 in column 104 of chart 100 of FIG. 2. The pilot then moves the lever 44 into position 1, and then into position 0 to attain the desired cruising altitude for the aircraft 10.

Instead, if the pilot chooses a "normal" takeoff, the slats 16-30 and the flaps 32-38 are set to the position that corresponds to lever position 3 in column 104 of chart 100 of FIG. 2. The pilot then subsequently moves the lever 44 into positions 2, 1 and then position 0 to attain the desired cruising altitude for the aircraft 10.

Now, if the pilot chooses a "short field" takeoff, the slats 16-30 and the flaps 32-38 are set to the position that corresponds to lever position 4 in column 104 of chart 100 of FIG. 2. The pilot then subsequently moves the lever 44 into positions 3, 2, 1 and then position 0 to attain the desired cruising altitude for the aircraft 10. While in lever position 4, one can see that the high lift slat/flap configuration of embodiments of the present invention is now fully utilized. That is, when moving the lever in the fore or retracted direction, the pilot is starting from a short field take-off to attain a cruising flight phase for the aircraft 10. The chart 100 of FIG. 2 specifies a particular angular orientation for the slats 16-30 for lever position 4 for the short field take-off. In the chart 100 of FIG. 2, the angular values for the slats 16-30 are different than the angular values for the slats 16-30 when the pilot was landing the aircraft by moving the lever 44 in the opposite, aft or extend direction, as discussed earlier. It is this position 4 of the lever 44 in the chart 100 of FIG. 2 that takes advantage of embodiments of the present invention set forth herein by utilizing two different angular positions for the slats 16-30 depending upon the aircraft being in a take-off or a landing mode of operation.

It should be understood that the broadest scope of the present invention is not limited to a six position high lift selector lever 44. Nor is it limited to having two different angular positions for just the slats 16-30 depending upon whether the aircraft is in take-off or landing mode. Different positions for the flaps 32-38 in any one or more positions of the lever 44 (and not necessarily the same lever position for the two different angular positions for the slats 16-30; i.e., lever position 4 in the embodiment described hereinabove) fall within the broadest scope of the present invention. These different positions for the flaps 32-38 can be in conjunction with different positions for the slats 16-30 or can be just for the flaps 32-38 alone.

Figure 3:
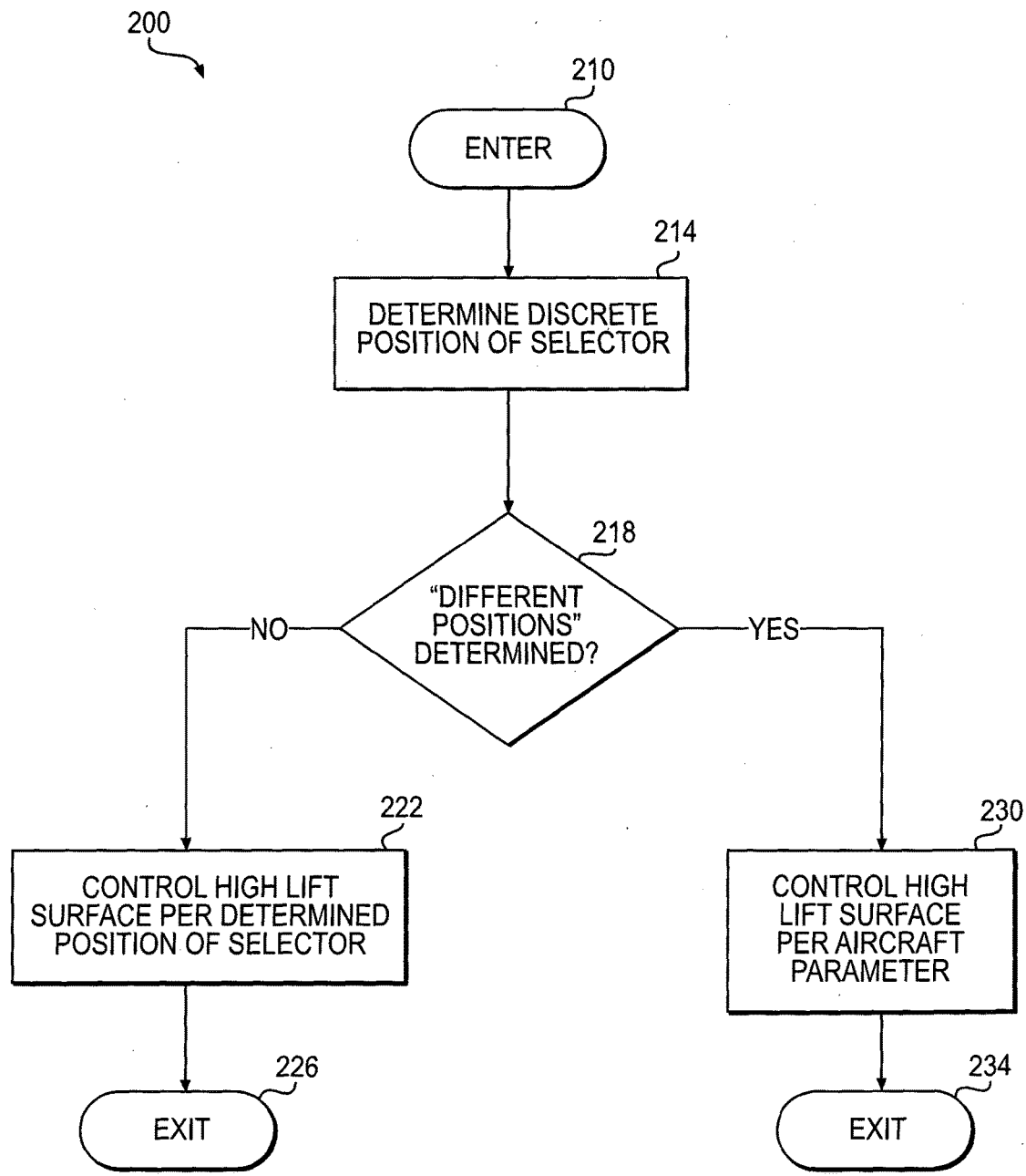
FIG. 3 is a flow chart of steps executed in a method for controlling at least one high lift surface of an aircraft in accordance with embodiments of the present invention.

Referring to FIG. 3, there illustrated is a flow chart 200 embodying a method comprising steps for controlling operation of the high lift control system computer 40 to implement embodiments of the present invention in which a position of at least one high lift surface (e.g., slats 16-30 and/or flaps 32-38) are controlled. Specifically, the method may be embodied in software that runs on the high lift control system computer 40, or on any other computer, processor or logic device located on the aircraft 10.

In FIG. 3, after an enter step 210, a step 214 is executed in which the discrete position of the selector (e.g., the high lift selector lever 44) is determined. This may be carried out simply by reading the value of a position sensor associated with the selector.

Next, a check 218 is executed in which the determined discrete position of the selector from step 214 is checked to see if it corresponds to the at least one position of the selector that is associated with different positions of the at least one high lift surface (e.g., slats 16-30 and/or flaps 32-38).

If the determined discrete position of the selector from step 214 does not correspond to the at least one position of the selector that is associated with different positions of the at least one high lift surface, then a step 222 is executed in which the at least one high lift surface is controlled (i.e., its position selected) according to the determined discrete position of the selector. The method then exits in a step 226.

On the other hand, if the determined discrete position of the selector from step 214 does correspond to the at least one position of the selector that is associated with different positions of the at least one high lift surface, then a step 230 is executed in which the at least one high lift surface is controlled (i.e., its position selected) according to a particular aircraft parameter. The aircraft parameter may comprise, for example, an operating condition of the aircraft that may comprise one of the aircraft being on the ground or the aircraft being in-flight. The aircraft parameter may also comprise, for example, a direction of movement of the selector, a speed of the aircraft, or any other desired aircraft parameter that should be obvious to one of ordinary skill in the art in light of the teachings herein. The method then exits in a step 234.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The computer program product may, for example, be executed by a control system, such as, for example, the high lift control system computer 40 of FIG. 1.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., the control system computer 40 of FIG. 1), other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A high lift control system for an aircraft having one or more high lift surfaces including one or more of the following: one or more slats disposed on a leading edge of a wing of the aircraft and one or more flaps disposed on a trailing edge of the wing of the aircraft, the high lift control system comprising:
    a high lift selector movable between a number of predetermined discrete positions, one of the predetermined discrete positions of the selector being associated with a first high lift configuration for a first flight phase of the aircraft and also with a different second high lift configuration for a second flight phase of the aircraft; and
    a computer configured to, based on one or more signals from one or more aircraft systems, command the one or more high lift surfaces according to either the first high lift configuration or the second high lift configuration when the selector is moved to the one of the predetermined discrete positions.

2. The high lift control system of claim 1, wherein the first high lift configuration and the second high lift configuration correspond to different positions of at least one slat.

3. The high lift control system of claim 1, wherein the first high lift configuration and the second high lift configuration correspond to different positions of at least one flap.

4. The high lift control system of claim 1, wherein the first high lift configuration and the second high lift configuration correspond to different positions of at least one slat and of at least one flap.

5. The high lift control system of claim 1, wherein the one or more signals are indicative of a direction of movement of the selector for arriving to the one of the predetermined discrete positions.

6. The high lift control system of claim 1, wherein the one or more signals are indicative of whether the aircraft is on the ground or in flight.

7. A high lift control system for an aircraft having at least one high lift surface, the high lift control system comprising:
    a high lift selector that is movable in:
    a first direction of movement from an in-flight cruise position to land the aircraft; and
    a second direction of movement from an on-the-ground position toward the in-flight cruise position to have the aircraft take-off,
    the selector having a plurality of discrete positions, at least one of the plurality of discrete positions of the selector being one in which the at least one high lift surface has a corresponding different position for each of the first direction of movement and the second direction of movement of the selector for arriving to the at least one discrete position.

8. The high lift control system of claim 7, comprising a computer configured to determine which corresponding different position of the at least one high lift surface is to be selected based on an operating condition of the aircraft.

9. The high lift control system of claim 8, wherein the operating condition comprises an aircraft on ground condition or an aircraft in flight condition.

10. The high lift control system of claim 7, comprising a computer configured to determine which corresponding different position of the at least one high lift surface is to be selected based on the first direction of movement of the selector or on the second direction of movement of the selector.

11. The high lift control system of claim 7, comprising a computer configured to determine which corresponding different position of the at least one high lift surface is to be selected based on an aircraft speed.

12. The high lift control system of claim 7, wherein the selector comprises one of a lever, a knob, a graphical representation of a lever on a touchscreen and a graphical representation of a knob on a touchscreen.

13. A method for controlling a position of at least one high lift surface on an aircraft, the method comprising the steps of:
    determining a discrete position of a selector having a number of predetermined discrete positions, at least one of the predetermined discrete positions of the selector corresponding to at least two different positions of the at least one high lift surface;

determining if the determined discrete position of the selector corresponds to the at least one of the predetermined discrete positions of the selector that corresponds to at least two different positions of the at least one high lift surface;

if the determined discrete position of the selector corresponds to the at least one of the predetermined discrete positions of the selector that corresponds to at least two different positions of the at least one high lift surface, then controlling the position of the at least one high lift surface based on a parameter of the aircraft; and if the determined discrete position of the selector does not correspond to the at least one of the predetermined discrete positions of the selector that corresponds to at least two different positions of the at least one high lift surface, then controlling the position of the at least one high lift surface based on the determined position of the selector.

14. The method of claim 13, wherein the parameter of the aircraft comprises an operating condition of the aircraft.

15. The method of claim 14, wherein the operating condition of the aircraft comprises one of the aircraft being on the ground or in-flight.

16. The method of claim 13, wherein the parameter of the aircraft comprises a direction of movement of the selector for arriving to the determined discrete position.

17. The method of claim 13, wherein the parameter of the aircraft comprises a speed of the aircraft.

18. A computer program product for controlling a position of at least one high lift surface on an aircraft, the computer program product comprising a computer readable storage medium having program code embodied therewith, the program code readable/executable by a computer, processor or logic circuit to perform a method comprising the steps of:

determining a discrete position of a selector having a number of predetermined discrete positions, at least one of the predetermined discrete positions of the selector corresponding to at least two different positions of the at least one high lift surface;

determining if the determined discrete position of the selector corresponds to the at least one of the predetermined discrete positions of the selector that corresponds to at least two different positions of the at least one high lift surface;

if the determined discrete position of the selector corresponds to the at least one of the predetermined discrete positions of the selector that corresponds to at least two different positions of the at least one high lift surface, then controlling the position of the at least one high lift surface based on a parameter of the aircraft; and if the determined discrete position of the selector does not correspond to the at least one of the predetermined discrete positions of the selector that corresponds to at least two different positions of the at least one high lift surface, then controlling the position of the at least one high lift surface based on the determined position of the selector.

19. The computer program product of claim 18, wherein the parameter of the aircraft comprises an operating condition of the aircraft.

20. The computer program product of claim 19, wherein the operating condition of the aircraft comprises one of the aircraft being on the ground or in-flight.

21. The computer program product of claim 18, wherein the parameter of the aircraft comprises a direction of movement of the selector for arriving to the determined discrete position.

22. The computer program product of claim 18, wherein the parameter of the aircraft comprises a speed of the aircraft.

* * * * *